(12) United States Patent
Siu et al.

(10) Patent No.: US 6,522,641 B1
(45) Date of Patent: Feb. 18, 2003

(54) INTEGRATED DATA CENTRIC NETWORK (IDCN)

(75) Inventors: Patrick Siu, Winnipeg (CA); Yair Bourlas, San Diego, CA (US); Richard J. Nowak, Nepean (CA); Wendy S. Smith, Ottawa (CA); Wing F. Lo, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/323,779

(22) Filed: Jun. 1, 1999

Related U.S. Application Data

(60) Provisional application No. 60/087,675, filed on Jun. 2, 1998.

(51) Int. Cl.$^7$ .............................. H04Q 7/20; H04B 1/38
(52) U.S. Cl. .................... 370/338; 370/352; 370/310.1; 370/310.2; 370/401; 455/560; 455/422; 455/445
(58) Field of Search .................... 455/445, 426, 455/422, 561, 560; 370/328, 329, 338, 352, 353, 354, 356, 366, 310.1, 310.2, 401, 465, 466

(56) References Cited

U.S. PATENT DOCUMENTS

| | | | |
|---|---|---|---|
| 5,537,411 A | | 7/1996 | Plas |
| 5,940,381 A | * | 8/1999 | Freeburg et al. ............ 370/331 |
| 6,157,636 A | * | 12/2000 | Voit et al. .................... 370/353 |
| 6,377,554 B1 | * | 4/2002 | Farnsworth et al. ........ 370/252 |

FOREIGN PATENT DOCUMENTS

| | | |
|---|---|---|
| EP | 0 647 074 A | 4/1995 |
| EP | 0 818 940 A | 1/1998 |
| WO | WO 97 48191 A | 12/1997 |

OTHER PUBLICATIONS

U.S. patent application Ser. No. 09/202,227, Claims 1–46 only.
Wile, G E et al.: "The Architecutre ofthe DPN Data Networking System", Integrating the World Through Communications, Toronto, CA, Jun. 22–25, 1986, vol. 2, Jun. 1986, pp. 1269–1273, XP000808968, Institute of Electrical and Electronics Engineers.
Ray Hunt: "ATM–protocols and architecture" Computer Communications, No. 19, 1996, pp. 597–611, XP002120844.

* cited by examiner

*Primary Examiner*—William Trost
*Assistant Examiner*—Eugene Yun
(74) *Attorney, Agent, or Firm*—Gibbons, Del Deo, Dolan, Griffinger & Vecchione

(57) ABSTRACT

A fixed wireless point-to-multipoint distribution network for providing seamless communication coverage to plurality of subscribers that includes a plurality of base stations for providing wireless access to said subscriber; each base station having connectivity to one another on a first network layer via at least one of a number of IP and/or ATM switches, called IDCN switches; each IDCN switch having connectivity to another over a second network layer via a transport ring thereby enabling one user to communicate directly with another user in said first network layer, or externally of said first network layer via one of said IDCN switches.

An integrated data centric network is provided that integrates voice, data and video services into a single network, defines user services by the end user by providing middleware to enable the end user to develop services and applications; and provides a carrier grade service with distributed networking and services.

8 Claims, 7 Drawing Sheets

INTEGRATED DATA CENTRIC NETWORK (IDCN)

CROSS-REFERENCE TO RELATED PATENT APPLICATIONS

U.S. Provisional Patent No. 60/087,675 filed Jun. 2, 1998.

STATEMENT REGARDING FEDERALLY SPONSORED RESEARCH OR DEVELOPMENT

Not Applicable.

BACKGROUND OF THE INVENTION

1. Field of the Invention

This invention related to a fixed wireless point-to-point and/or point-to-multipoint communication system but more particularly, to an Integrated Data Centric Network (IDCN) wherein voice, data and video services are integrated on the same network.

2. Discussion of Related Art

Traditional fixed wireless access networks have, in the past, had to use separate networks in order to provide voice and data services to remote customers. The voice network offers the best quality of service to the customers, but lack the efficiency requires for data transport. The data network, in particular the IP network, offers the data transport efficiency, but lack the quality of services required by voice and video services. In addition, since the intelligence was actually contained within the network, the customer services were actually defined by the network and therefore new services cannot be easily deployed and commercialized as well as the services are not easily portable. These types of networks wherein the intelligence is contained within the network, makes use of dumb terminals and services and features are controlled by the service providers and switching equipment. Any such services are offered through complex signaling protocols and are therefore slow to be introduced. These types of networks have resulted in a high cost of network maintenance for customers.

Accordingly, a need exists for an integrated data centric network wherein voice, data and video services are integrated within the network. In addition, a need exists for integrated data centric network wherein services are defined by the user and enable service portability. Finally, a need exists for integrated data centric network wherein the voice, data and video services have the quality of services of the traditional voice networks; and transport efficiency of the traditional data (IP) networks.

BRIEF SUMMARY OF THE INVENTION

The present invention relates to a fixed wireless point-to-multipoint distribution network for providing seamless communication coverage to plurality of subscribers, comprising:

a plurality of base stations for providing wireless access to said subscriber;

each base station having connectivity to one another on a first network layer via at least one of a number of IP and/or ATM switches, called IDCN switches;

each IDCN switch having connectivity to another over a second network layer via a transport ring thereby enabling one user to communicate directly with another user in said first network layer, or externally of said first network layer via one of said IDCN switches.

An integrated data centric network is provided that integrates voice, data and video services into a single network; defines user services by the end user by providing middleware to enable the end user to develop services and applications; and provides a carrier grade service with distributed networking and services.

BRIEF DESCRIPTION OF THE SEVERAL VIEWS OF THE DRAWING

Particular embodiments of the invention will be described in association with the following drawings, in which.

DETAILED DESCRIPTION OF THE PREFERRED EMBODIMENT

Figure 1:
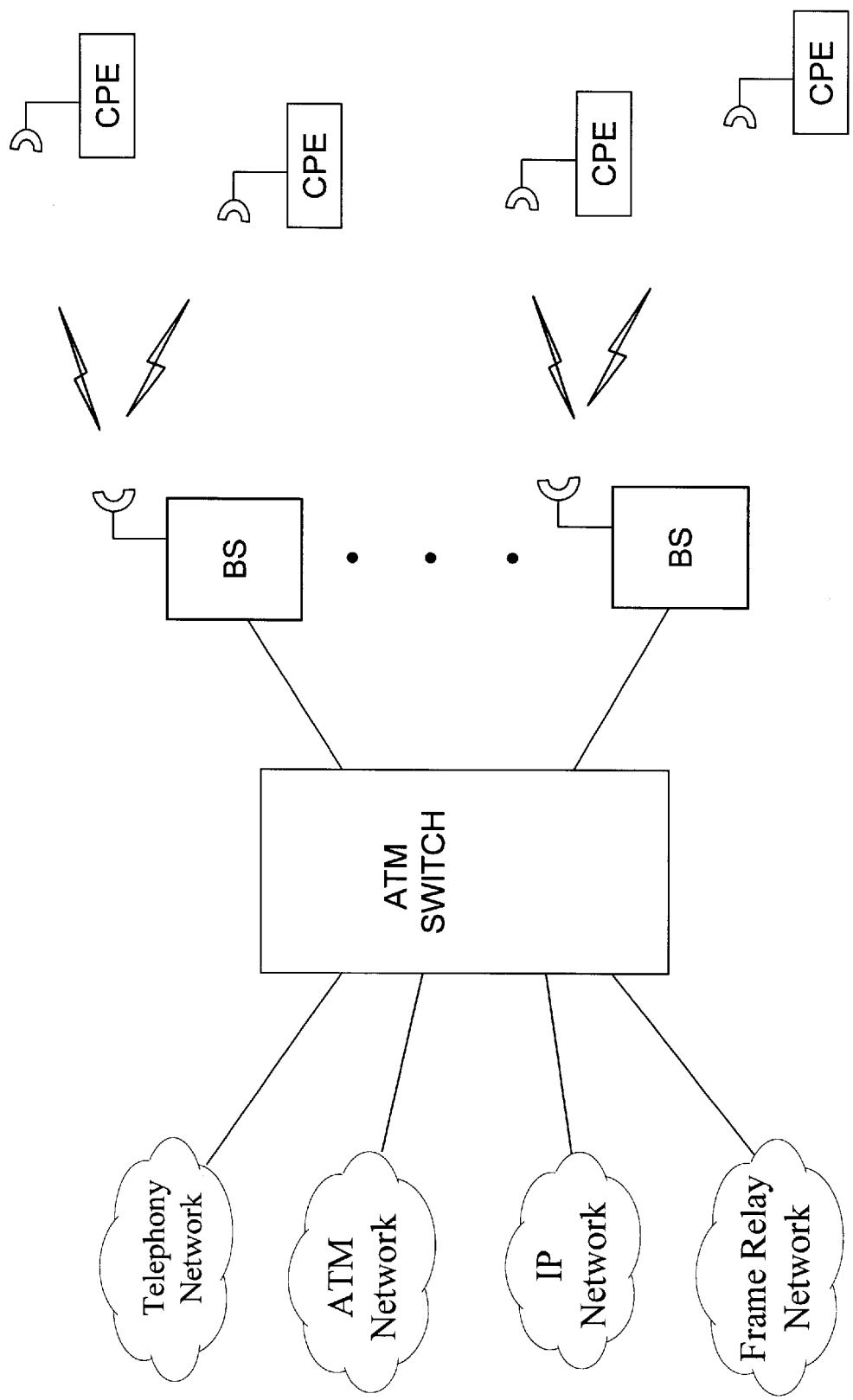
FIG. 1 is a block diagram of a prior art fixed wireless point-to-multipoint network.

Facilitate the description of the present invention, the following abbreviations have been used:

| | |
|---|---|
| CPE | Customer Premise Equipment |
| DHCP | Dynamic Host Configuration Protocol |
| DMAT | Dynamic Modulation Adaption Technique |
| DPAT | Dynamic Power Adaption Technique |
| DS | Digital Signal (A Bellcore term in describing the level of digital signal hierachy) |
| DNS | Domain Name Server |
| GR | Generic Requirement (a Bellcore term for approved generic standard) |
| IDCN | Integrated Data Centric Network |
| IP | Internet Protocol, the context used in this document including all the network applications that run on top of the Internet Protocol |
| LAN | Local Area Network |
| LMCS | Local Multipoint Communication Service |
| LMDS | Local Multipoint Distribution System |
| MVDS | Multipoint Video Distribution Service |
| NIU | Network Interface Unit, a subscriber site device that provides the interface between the customer premise equipment and the wireless access network. |
| OAMP | Operation, Administration and Maintenance procedures |
| PBX | Private Branch Exchange |
| PC | Personal Computer |
| POTS | Plain Old Telephone Service |
| PVC | Permanent Virtual Circuit, a PVC is a connection that is set up using administrative procedures |
| PSTN | Public Switch Telephone Network |
| SNMP | Simple Network Management Protocol |
| SVC | Switched Virtual Circuit, a SVC is a connection that is set up using signaling procedures on a on-demand (per call) basis |
| TFTP | Trivial File Transfer Protocol |
| UNI | User to Network Interface in an ATM network |
| VPN | Virtual private network |

Fixed wireless point-to-multipoint access networks consist of topologies having multiple overlapping cells, which provide coverage to an urban, suburban or rural area. The design of overlapping cell structures will depend on the application but should ideally provide for link redundancy for customer sites as well as for the accommodation of new urban structures which may block previously available links.

Those systems that make use of wireless ATM access are designed around the concepts of frequency division multiple access (FDMA) and time division multiple access (TDMA). The FDMA is used for service bandwidths from DS1/E1 and above (i.e. leased lines) and TDMA is used for bursty traffic sources with rates specifically below DS1/E1. TDMA systems are designed to share bandwidth among many users, thus allowing for its greater efficiency when dealing with bursty traffic sources. TDMA systems allow for bandwidth sharing, thereby providing for multiple bursty or low bit rate users to access the channel. The TDMA systems share a single demodulator between hundreds of users and are especially appropriate for 10baseT ethernet, IP and POTS voice applications. FDMA systems, on the other hand, are designed to provide dedicated bandwidth to a specific user, with those users typically being leased line users that have fairly constant data rate requirements.

Wireless ATM systems allow for the use of broadband microwave infrastructure, thereby making effective use of the multicarrier nature of the broadband microwave system. These multicarrier systems allow for the best mixture of low entry costs of the network operator with flexibility to expand the cell range and traffic handling capabilities.

Typically, at each cell site, there exists a base station consisting of microwave and digital radio equipment. The base station provides the network connections, with the connections being typically OC3c ATM UNI interface. Base station microwave equipment is mounted on the top of the building, typically outside, and provides the wireless connection capability to the subscriber.

At the customer premises, outdoor microwave equipment (antenna integrated with transceiver) connects to a network interface. Cell sizes are typically 1–10 kilometers, depending on the frequency of the system operation, availability level which is required by the system operator, and service's performance that is required by the system operator. Generally, the wireless access system is designed to cost effectively support system requiring voice, video and data solutions, in which the number of customers is large enough to warrant a point-to-multipoint implementation. These types of systems include LMCS (Canada), LMDS (U.S. and worldwide) and MVDS (Europe).

Referring now to FIG. 1, we have shown a block diagram of a wireless distribution system according to the prior art. In this configuration, customers receive fixed wireless access to the telephone network via various customer premise equipment. Access is provided by means of a wireless link, communication tower and a base station. An ATM switch is used to provide access to various multimedia services, such as voice and data. The connection between the base station and the ATM switch might either be done via a leased line of a point-to-point wireless link.

In order for a customer to access one of various services, such as voice, data, the ATM switch requires a connection link to the PSTN (through the public network), a link to IP network for internet access or a link to a Frame Relay network for data communications. Similarly, a link may be provided to access other ATM networks.

Figure 2:
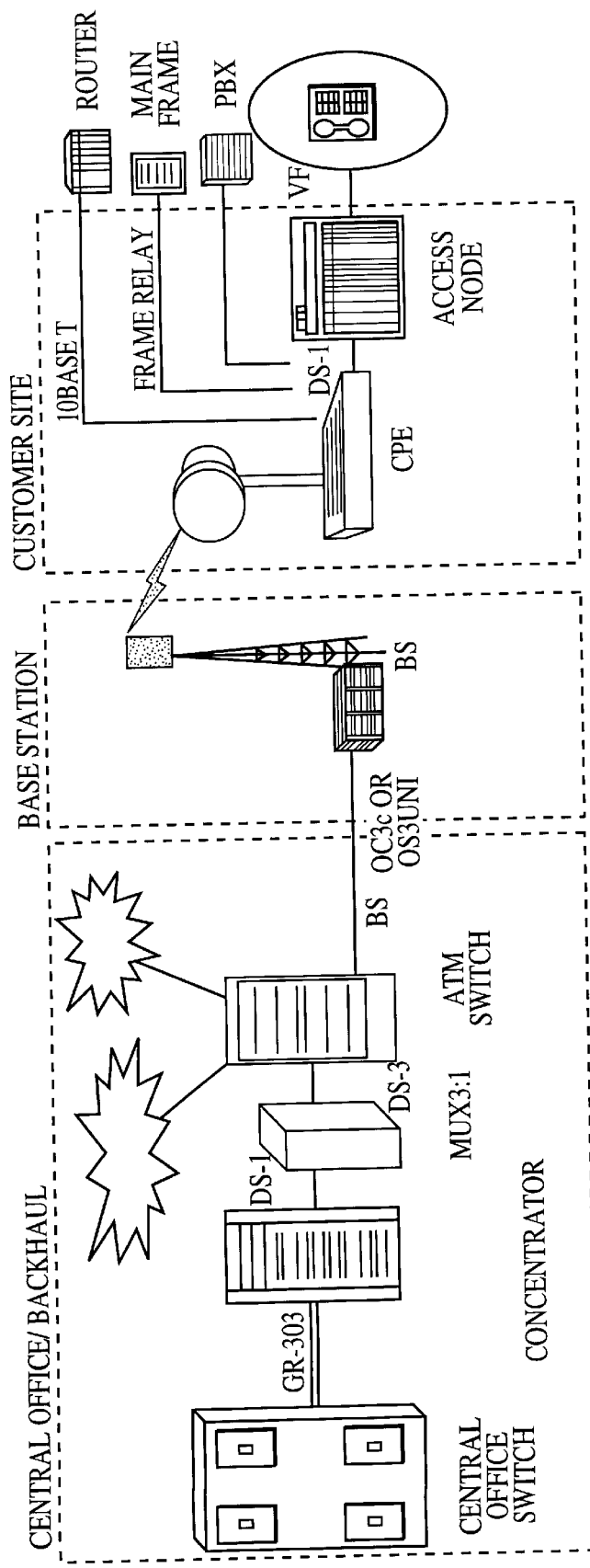
FIG. 2 is a block diagram illustrating the transport of voice and data (IP and Frame Relay) services over the prior embodiment of FIG. 1.

In a situation where the subscriber requires access or a link with the PSTN, the ATM switch is required to be connected to the central office switch via a multiplexer and concentrator as shown in FIG. 2.

As illustrated in FIG. 2, depending on the customer's site configuration, the customer premise equipment can either be connected to a PBX via 10BaseT ethernet link or an access node via a DS1 link. The Customer site is then linked to the base station via a wireless fixed access link. The base station consists of modulators, demodulators, and transmitting/ receiving radio equipment, which is connected to the ATM switch via either a leased line of a point-to-point wireless link. The ATM switch is then connected to a 2 to 1 multiplexer via a DS3 link. The ATM switch is then connected to a 3 to 1 multiplexer via a DS3 link. The multiplexer then connects to the concentrator via a DS1 link before being connected to the central office switch via a GR303 signaling link.

As indicated previously, the shortcomings associated with this existing telecom network is that separate voice and data networks are required depending on the communication needs of the subscriber. Since access to various services may have different owners, customer services are actually defined by the network as opposed to the customer. Similarly, by the very nature of the network, the service logic resides in the network thereby making service portability difficult to achieve. The end-to-end network design is such that the network dictates to the customer the capacity and availability of a communication link to the customer. In other words, regardless of the needs of the subscriber, the network will deliver what it can, when it can.

Another problem associated with the prior art telecom networks is that the intelligence is contained within the network. That is, subscribers are provided with terminals wherein features and services are controlled by the switching centers. Because the services are offered through complex signaling protocols, operators are slow to introduce new services and applications. Complex inter-working functions between protocols are caused by the clear distinction between protocols used within the network and the protocols between users of network and the protocols between users of network elements.

In view of this complexity, service operators do not like giving access to services and transport protocols to prevent any potential network failures. This results in a limited amount of user-to-user signaling. This complexity further results in a rigid billing structure and a high cost of network maintenance for the operator.

Figure 3:
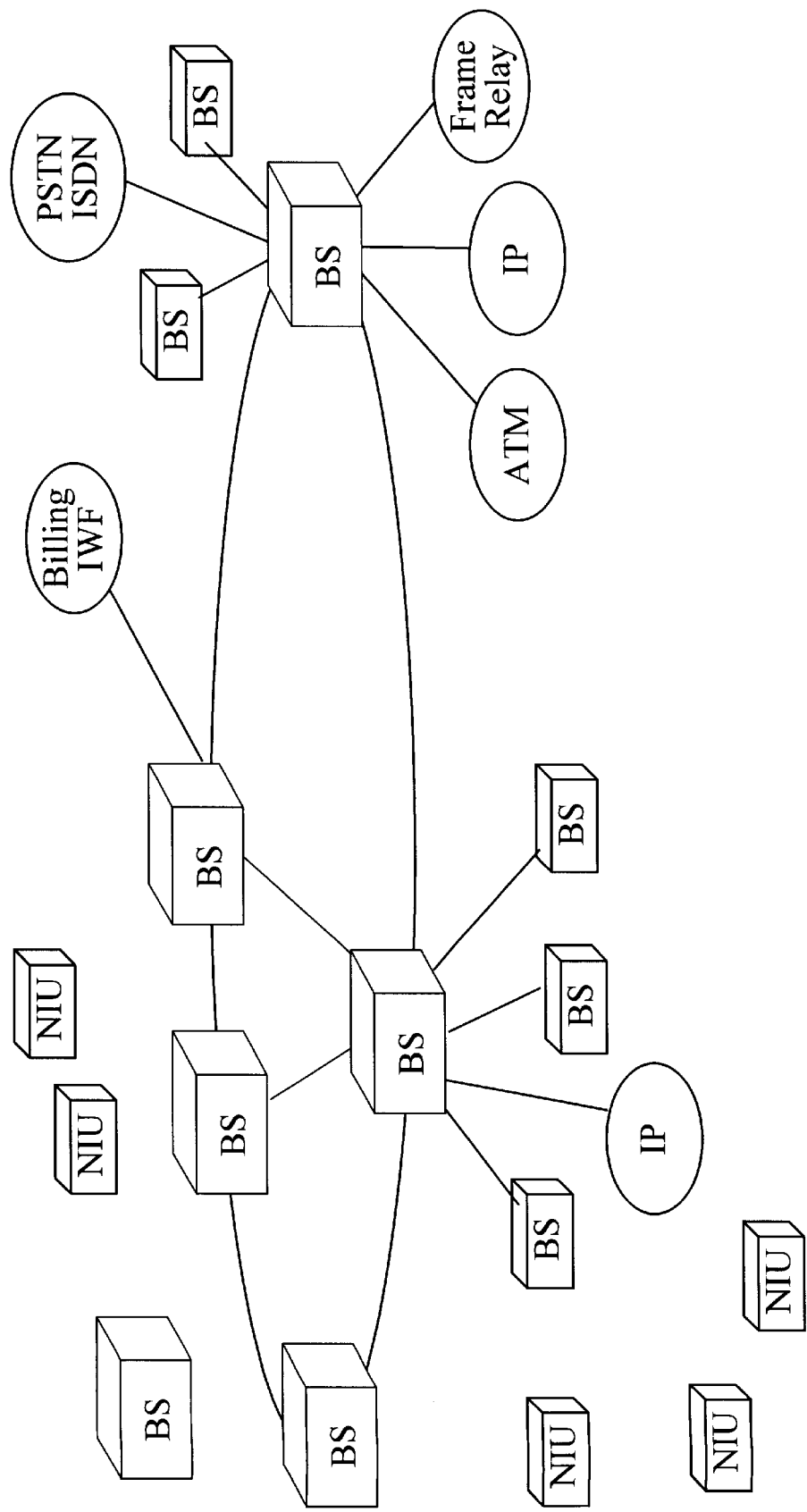
FIG. 3 is an illustration of the fixed wireless point-to-multipoint network of the present invention.
Figure 4:
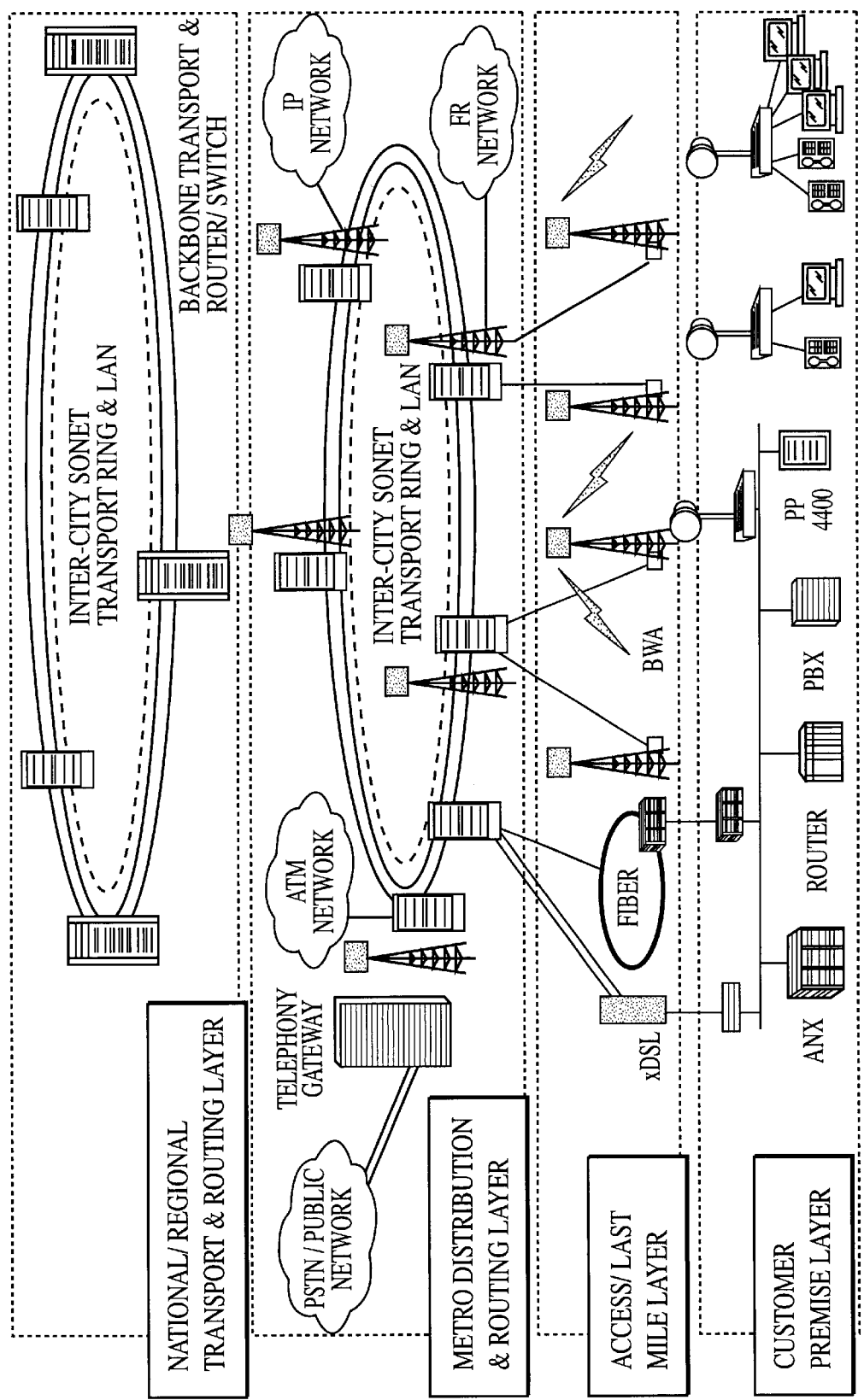
FIG. 4 illustrates the multiple transport layers for the fixed wireless point-to-multipoint system of the present invention.

Referring now to FIG. 3, we have shown a block diagram illustrating the network configuration of the fixed wireless point-to-multipoint network of the present invention. The architecture of FIG. 3 provides an Integrated Data Centric Network wherein voice, data and video network services become integrated. The network configuration enables service portability as well as user defined services required by individual users. Network parameters and requirements are dictated by a user's needs as opposed to the network needs. Each end user is provided with an intelligent terminal, such as a PC, to enable service logic of the network to reside at the end user's terminal. The network, in effect, provides the middleware (signaling functions between the end user terminal and the network) to enable users to develop services and applications according to their needs. The network configuration illustrated in FIG. 3 represents a hybrid ring, star, and mesh architecture wherein a plurality of base stations provide wireless access to a plurality of subscribers. Each base station has connectivity to one another on the first network layer via at least one of a number of IDCN switches. This enables one user to communicate directly to another user in this first network layer. As illustrated in FIG. 4, each IDCN switch has connectivity to one another on a second network layer over the hybrid ring.

As illustrated in FIG. 4, at the national/regional level, a transport and routing layer is supported by means of multiple IDCN switches connected in a ring and star configuration. Similarly, at the metro distribution level and routing layer, a transport ring and LAN are utilized between base stations with connectivity to IDCN switches to enable access to a higher level of layers. The routing layer enables a customer to access the IDCN network, IP network, frame relay network or the PSTN public network via a gateway. The sub-layer to the metro distribution and routing layer is the access/last mile layer where the base station communicates over fixed wireless access to multiple customers identified as the customer premises layer.

Figure 5:
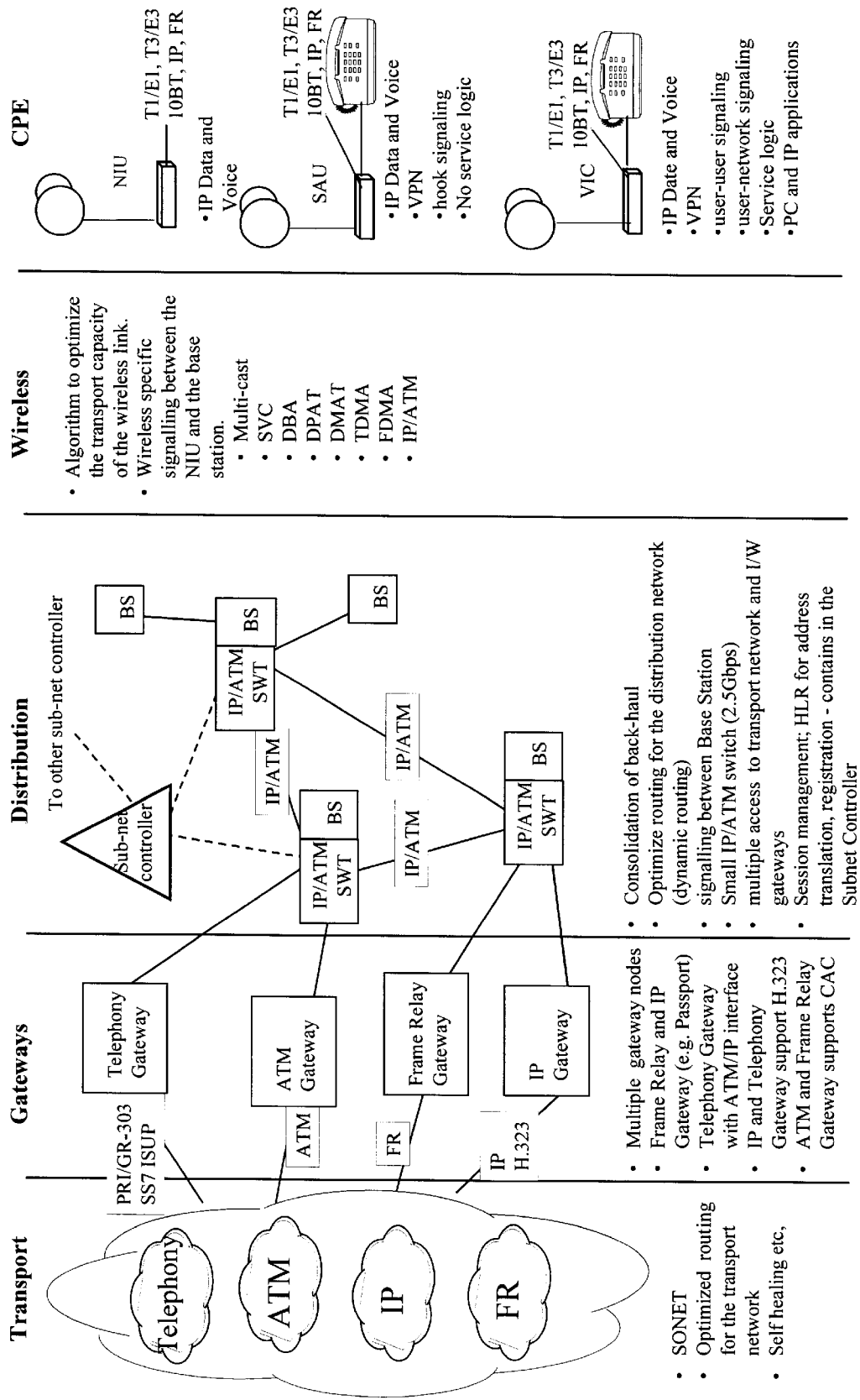
FIG. 5 is a functional block diagram illustrating the network architecture of the fixed wireless point-to-multipoint system of the present invention.

Referring now to FIG. 5, we have shown a block diagram illustrating the network architecture of the fixed wireless point-to-multipoint system of the present invention. As indicated above, the distribution level is done on one layer between base stations and IDCN switches. This enables the consolidation of back haul from the base station to IDCN switches, as well as base station to base station, thereby optimizing the routing for the distribution network. In addition, user-to-user traffic will stay within the network without going through a third party network, thus reducing the costs of network services. This configuration enables signaling between base stations, managing sections, and containing home location register for address of translation/registration within the subnet controller. Depending on the user requirement, the IDCN switch can access the H.323 servers, IP gateway, ATM gateway, Frame Relay gateway or the telephony gateway for voice, data and video communication with users from a third party network. The fixed wireless point-to-multipoint system consists of several major system software and hardware blocks. These are the point-to-multipoint base stations for ATM or IP transport; customer premise equipment; building interfaces; centralized compression; and/or network operations center.

The IDCN base station consists of digital and microwave equipment designed to route ATM cells or IP packets to appropriate modulators, with the cells or IP packets being transmitted to the subscriber population. The base station provides both FDMA and TDMA access alternatives. Encryption is performed on a per logical channel per subscriber basis. Routing is performed on a logical channel basis. ATM signaling interfaces support SVC and PVC connections. IP signaling interfaces support IP connections. Open NMS interfaces as provided through the use of SNMP interface standards on all equipment including microwave transmitters and receivers. ATM OC-3c UNI network interface are provided for ATM connections and 100BaseT network interface for IP connections. The base stations include both video network to wireless transmission equipment, as well as microwave transmitters, receivers, antennae and common equipment elements.

Figure 6:
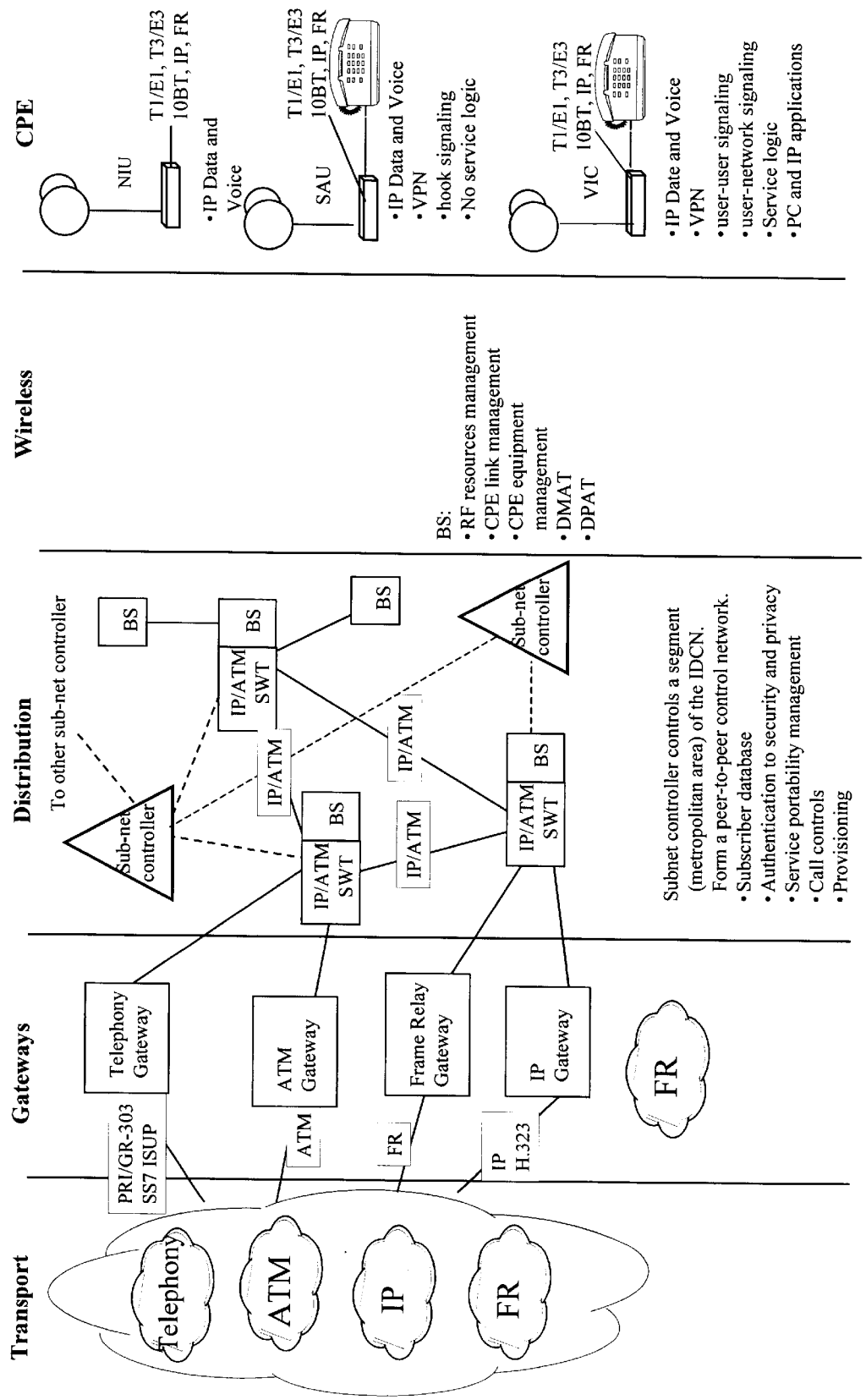
FIG. 6 is a functional block diagram of the control and management functions for the fixed wireless point-to-multipoint system of the present invention.

Referring to FIG. 6, we have shown the function block diagram of the subnet controller. Multiple and distributed subnet controller can exist within a single IDCN network. Each subnet controller controls a segment (metropolitan area) of the IDCN network. Multiple subnet controllers form a peer-to-peer control network. The key functions provided by the subnet controller are subscriber database, authentication, security, privacy, service portability management, call controls, session management and provisioning.

Figure 7:
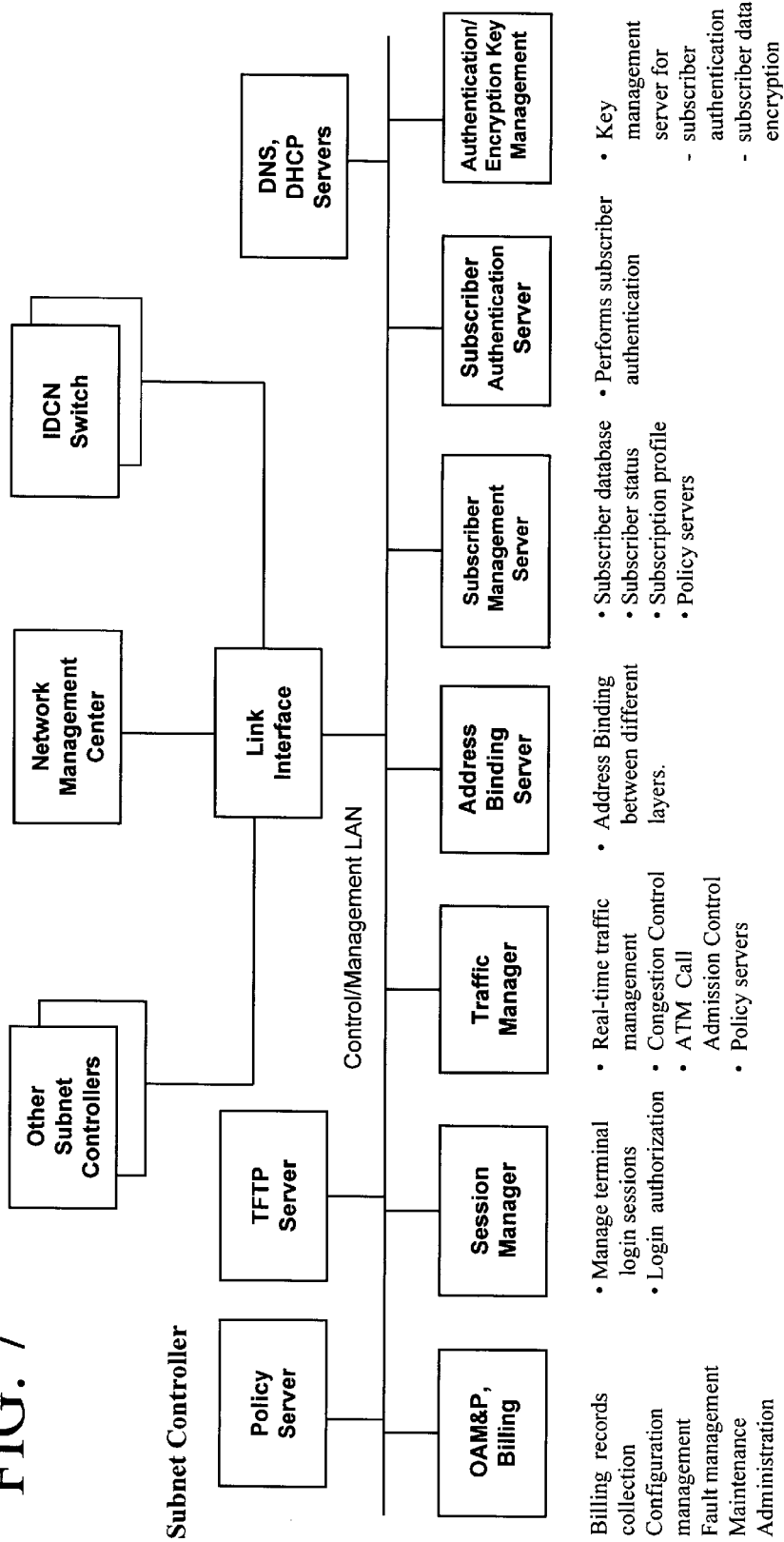
FIG. 7 is a functional block diagram of the subnet controller for the fixed wireless point-to-multipoint system of the present invention.

Referring to FIG. 7, we have shown the block diagram configuration of the subnet controller. The subnet controller has two functional blocks, namely, interface and services. The interface section provides the interface connections to other subnet controllers, the network management center and to the IDCN switches. The service section provides server functions such as, 1. Policy server—controls the bandwidth, Quality of Service, and access policies of the subscriber;
2. TFTP server—provides file transfer services for diskless clients;
3. DNS, DHCP server—provides address mapping and address resolution services;
4. OAMP, Billing—provides billing records collection, configuration management, fault management, maintenance and administration;
5. Session manager—manages terminal login and connection sessions, login authorizations;
6. Traffic manager—provides real time traffic management, congestion control, call admission control;
7. Address binding server—provides address binding between different layers;
8. Subscriber management server—manages subscriber database, subscriber status, subscription profile;
9. Subscriber authentication server—provides subscriber authentication; and
10. Authentication/Encryption key management—furnishes encryption key management for subscriber authentication and subscriber data encryption.

Based on the information and functions provided by the subnet controller, high speed tunnels can be established between the subscribers for subscribers within the same network; and high speed tunnels can be established between the subscriber and the gateway for connection to another subscriber in a third party network; therefore improving the routing efficiency and reducing networking costs of the network.

The link interface serves as a liaison (agent) to the external world (outside the subset controller). A typical event flow is as follows An external request comes in through the link interface, which deciphers the request, determines the procedures to be used, and generates requests to the appropriate servers for actions or information retrieval. Each involved server acts on the request and generates the appropriate responses.

The link interface consolidates the responses and works through the appropriate algorithms to thereafter send responses or controls to the relevant switch, base station, or other subnet controller.

For example, a request to establish a high speed tunnel between two network entities involves the following event flow:

The link interface receives and deciphers the request, chooses the high speed tunnel set up procedure, and sends requests to the:

subscriber authentication server to see if the subscriber is legitimate;

subscriber management server to see if the subscriber account is up-to-date and to get information on the level of service and settings of features;

policy server to determine the rules and boundaries of the tunnel to be set up (i.e., how the tunnel should be set up);

address binding server to set up the address binding between the requested two points; and OAM&P and billing to begin recording the billing information.

The link interface consolidates the responses and goes through the tunneling set up algorithm and sends controls to the switches on the path of the request to identify two points to establish the tunnel.

After receiving acknowlegement from all the involved network entities, the link interface sends a response to the requester indicating that the high speed tunnel is established as well as indicating the tunnel (path) information.

What is claimed is:

1. A fixed wireless point-to-multipoint network for providing seamless communication coverage to a plurality of subscribers, comprising:

a plurality of base stations for providing wireless access to said subscribers;

each base station having connectivity to one another on a first network layer via at least one of a number of integrated data centric network (IDCN) switches;

each of the IDCN switches having connectivity to one another over a second network layer via a transport ring thereby enabling one user to communicate directly with another user in said first network layer via one of said IDCN switches;

a subnet controller configured to provide information and functions; and direct connection tunneling established between the subscribers by the information and functions provided by the subnet controller whereby the network routing efficiency improves and network costs reduce.

2. A network as in claim 1, further comprising a subnet controller configured to provide information and functions; and intelligent customer premise equipment configured to cooperate with the information and functions provided by the subnet controller to make available to a subscriber a capability of dictating when and how much bandwidth is required.

3. A network as in claim 1, wherein the first and second network layers are different from each other, each being selected from a group consisting of a transport and routing layer with multiple IDCN switches connected in a ring and star configuration, a metro distribution level and routing layer with a transport ring and local area network between base stations with connectivity to the multiple IDCN switches, an access/last mile layer with base stations communication over fixed wireless access, and a customer premise layer.

4. A method of communication through a point-to-multipoint wireless distribution network, comprising:

providing wireless access to subscribers via a plurality of base stations and a plurality of switches;

providing each of the base stations with connectivity to one another on a first network layer via at least one of the switches;

providing each of the switches with connectivity to one another over a second network layer via a transport, the transport representing any one of a ring architecture, star architecture and hybrid ring, star and mesh architecture;

communicating between subscribers directly in either the first network layer or externally of the first network layer via at least one of the switches;

providing information and functions with a subnet controller; and establishing direct connection tunneling between the subscribers by the information and functions provided by the subnet controller whereby the network routing efficiency improves and network costs reduce.

5. A method as in claim 4, wherein the switches are integrated digital centric network switches.

6. A method as in claim 4, wherein the communicating is carried out from providing seamless communication coverage to a plurality of the subscribers as a result of all of the providing steps.

7. A method as in claim 4, further comprising integrating voice, data and video services into the first and second layers.

8. A method as in claim 4, wherein the first and second network layers are different from each other, each being selected from a group consisting of a transport and routing layer with multiple IDCN switches connected in a ring and star configuration, a metro distribution level and routing layer with a transport ring and local area network between base stations with connectivity to the multiple IDCN switches, an access/last mile layer with base stations communication over fixed wireless access, and a customer premise layer.

* * * * *